United States Patent
Rimai et al.

(10) Patent No.: US 12,043,070 B2
(45) Date of Patent: Jul. 23, 2024

(54) FLEXIBLE METALLIC WEB ELEMENTS FOR NON-PNEUMATIC TIRE

(71) Applicant: Bridgestone Americas Tire Operations, LLC, Nashville, TN (US)

(72) Inventors: Benjamin E. Rimai, Copley, OH (US); Anthony B. Duncan, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 551 days.

(21) Appl. No.: 17/298,711

(22) PCT Filed: Dec. 19, 2019

(86) PCT No.: PCT/US2019/067381
§ 371 (c)(1),
(2) Date: Jun. 1, 2021

(87) PCT Pub. No.: WO2020/139679
PCT Pub. Date: Jul. 2, 2020

(65) Prior Publication Data
US 2022/0048325 A1    Feb. 17, 2022

Related U.S. Application Data

(60) Provisional application No. 62/785,797, filed on Dec. 28, 2018.

(51) Int. Cl.
*B60C 7/14*    (2006.01)
*B29D 30/02*    (2006.01)
(Continued)

(52) U.S. Cl.
CPC .............. *B60C 7/146* (2021.08); *B29D 30/02* (2013.01); *B60C 7/06* (2013.01); *B60C 7/18* (2013.01)

(58) Field of Classification Search
CPC .. B60C 7/06; B60C 7/18; B60C 7/146; B29D 30/02
See application file for complete search history.

(56) References Cited

U.S. PATENT DOCUMENTS 1,005,406 A    10/1911    Brotherton
1,078,150 A *  11/1913    Knight .................... B60C 7/18
                                                    152/287
(Continued)

FOREIGN PATENT DOCUMENTS

JP    2007238019    9/2007
JP    2012187982    10/2012
(Continued)

OTHER PUBLICATIONS

Extended European Search Report; Corresponding EP Application Serial No. 19905238; Sep. 15, 2022.
(Continued)

*Primary Examiner* — Kip T Kotter
(74) *Attorney, Agent, or Firm* — Shaun Fox; Bryan Jaketic (57) ABSTRACT

A non-pneumatic tire includes an inner ring, an outer ring, and a plurality of bent metal spokes. The non-pneumatic tire further includes a first overmolded foot at a first end of each bent metal spoke. Each first overmolded foot is attached to the inner ring. The non-pneumatic tire also includes a second overmolded foot at a second end of each bent metal spoke. Each first overmolded foot is attached to the outer ring.

18 Claims, 7 Drawing Sheets

(51) Int. Cl.
*B60C 7/06* (2006.01)
*B60C 7/18* (2006.01)

(56) References Cited

U.S. PATENT DOCUMENTS

| | | | |
|---|---|---|---|
| 1,262,550 A | 4/1918 | Northern | |
| 1,418,258 A | 5/1922 | Hayden | |
| 2006/0249236 A1 | 11/2006 | Moon | |
| 2010/0218869 A1* | 9/2010 | Abe | B60C 7/18 152/246 |
| 2012/0200149 A1* | 8/2012 | Rudakevych | B62D 55/075 301/62 |
| 2016/0243890 A1* | 8/2016 | Nishida | B60C 7/14 |
| 2017/0341464 A1 | 11/2017 | Nishida | |
| 2017/0368879 A1 | 12/2017 | Lettieri et al. | |
| 2017/0368881 A1 | 12/2017 | Shoji | |
| 2018/0154694 A1* | 6/2018 | Orlewski | B60B 9/26 |
| 2018/0170095 A1 | 6/2018 | Costlow | |
| 2018/0170107 A1* | 6/2018 | Costlow | B60C 7/18 |
| 2018/0345610 A1 | 12/2018 | Delfino et al. | |

FOREIGN PATENT DOCUMENTS

| | | |
|---|---|---|
| JP | 2012187983 | 10/2012 |
| JP | 2016107678 | 6/2016 |
| KR | 1020160088939 | 7/2016 |
| WO | 2009031650 | 3/2009 |
| WO | 2017072560 | 5/2017 |
| WO | 2017116463 | 7/2017 |
| WO | 2017116804 | 7/2017 |
| WO | 2018067597 | 4/2018 |
| WO | 2018115939 | 6/2018 |
| WO | 2018115940 | 6/2018 |
| WO | 2018125959 | 6/2018 |
| WO | 2018126037 | 7/2018 |
| WO | 2019089008 | 5/2019 |

OTHER PUBLICATIONS

International Search Report and Written Opinion; Corresponding PCT Application No. PCT/US2019/067381; Authorized Officer Hwang, Chan Yoon; Apr. 16, 2020.

* cited by examiner

FLEXIBLE METALLIC WEB ELEMENTS FOR NON-PNEUMATIC TIRE

FIELD OF INVENTION

The present disclosure relates to a web structure for a non-pneumatic tire, and a method of making the same. More particularly, the present disclosure relates to a method of making metallic web elements by pre-forming metal into web layers.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

The spokes or webbing may be made by a molding process. In some embodiments, the spokes or webbing are molded as a single, unitary piece. In other embodiments, multiple rings are molded and then axially joined to form the spoke or webbing structure. In still other embodiments, circular sectors are molded and then circumferentially joined to form the spoke or webbing structure. Traditional non-pneumatic tires that utilize a flexible web in their design use a flexible polymer for the webbing or spokes.

SUMMARY OF THE INVENTION

In one embodiment, a method of making a non-pneumatic tire includes providing a plurality of elongated sheets of metal material and bending the sheets to form a plurality of metal spokes. The method further includes overmolding a first foot onto a first end of each of the plurality of metal spokes. The method also includes providing an inner ring of metal material and affixing the inner ring of metal material to the first foot. The method further includes providing an outer ring of metal material and affixing the outer ring of metal material to a second end of each of the plurality of metal spokes. The method also includes providing tread rubber and affixing the tread rubber to the outer ring of metal material.

In another embodiment, a non-pneumatic tire includes an inner ring, an outer ring, and a plurality of bent metal spokes. The non-pneumatic tire further includes a first overmolded foot at a first end of each bent metal spoke. Each first overmolded foot is attached to the inner ring. The non-pneumatic tire also includes a second overmolded foot at a second end of each bent metal spoke. Each first overmolded foot is attached to the outer ring.

In yet another embodiment, a method of making a non-pneumatic tire includes providing a plurality of support structures, overmolding a first foot onto a first end of each of the plurality of support structures, and overmolding a second foot onto a second end of each of the plurality of support structures. The method also includes providing an inner ring and affixing the inner ring to the first foot. The method further includes providing an outer ring and affixing the outer ring to the second foot. The method also includes providing tread rubber and affixing the tread rubber to the outer ring.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
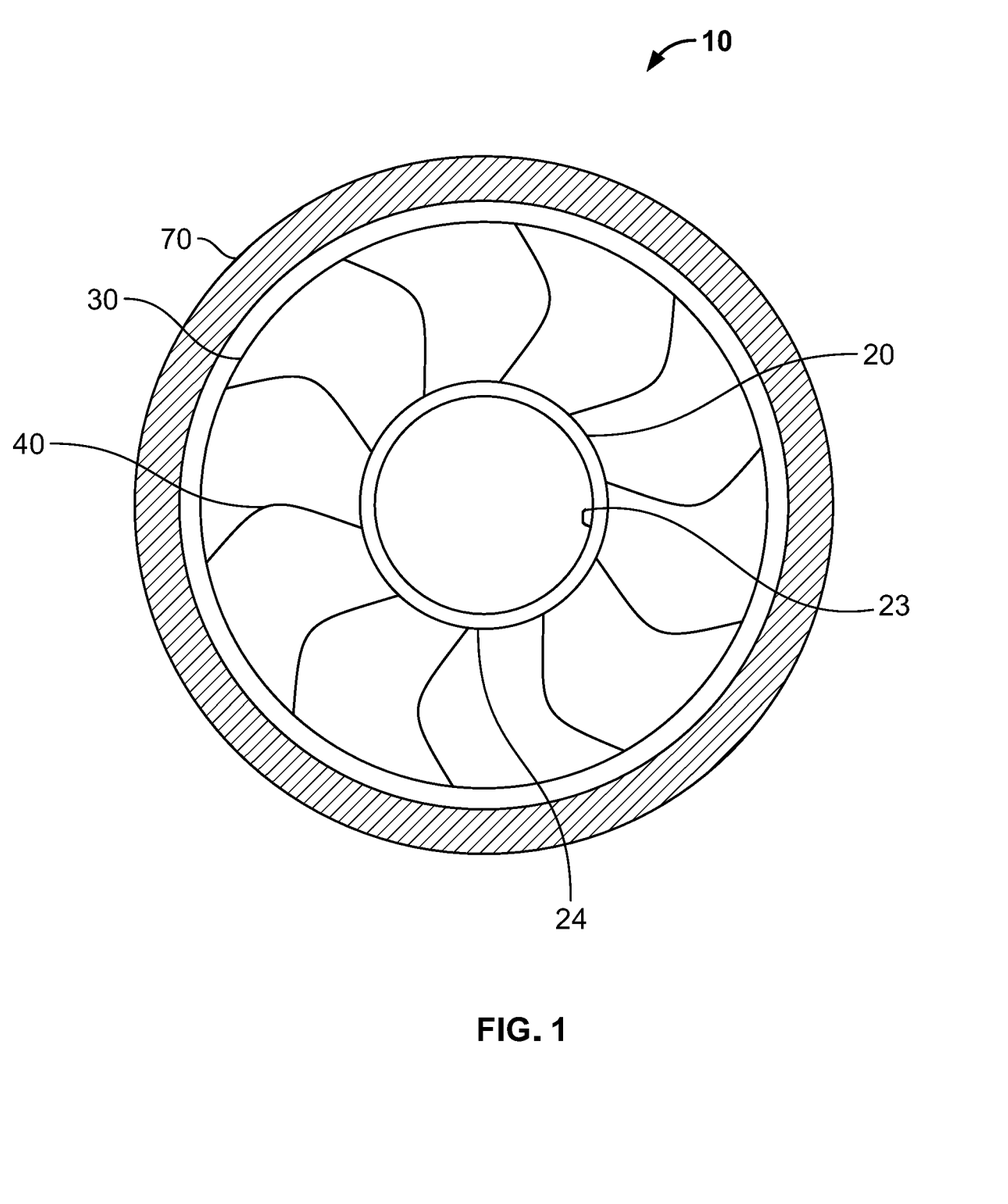
FIG. 1 is a schematic drawing illustrating a side view of an undeformed non-pneumatic tire.

FIG. 1 illustrates one embodiment of a non-pneumatic tire 10. The non-pneumatic tire 10 is merely an exemplary illustration and is not intended to be limiting. In the illustrated embodiment, the non-pneumatic tire 10 includes a generally annular inner ring 20 that engages a rim (not shown) to which the tire 10 is mounted. The generally annular inner ring 20 has an internal surface 23 and an external surface 24 and can be made of metal. In one embodiment, the generally annular inner ring 20 can me made of annealed spring steel. In another embodiment, the generally annular inner ring 20 can be made of a polymeric material. In another embodiment, the generally annular inner ring 20 can be made of a composite material.

The non-pneumatic tire 10 further includes a generally annular outer ring 30. A plurality of spokes 40 extend between the generally annular inner ring 20 and the generally annular outer ring 30. In alternative embodiments, a web or other support structure connects the inner ring to the outer ring. The outer ring 30 can be configured to deform in an area around and including a footprint region (not shown), which decreases vibration and increases ride comfort.

In one embodiment, the generally annular inner ring 20 and the generally annular outer ring 30 are made of the same material as the plurality of spokes 40. As shown in FIG. 1, the generally annular outer ring 30 has a radially external surface to which a tread layer 70 is attached. Attachment can be done adhesively, by curing, or by using other methods. The tread rubber 70 may have tread elements formed therein, such as ribs, blocks, lugs, grooves, sipes, and other tread elements. The tread rubber may also include internal structures. In one embodiment, the tread band includes a shear band. In another embodiment, the tread band includes a bending element.

In the illustrated embodiment shown in FIG. 1, the inner ring is a smooth inner ring configured to be mounted to a hub. In alternative embodiments, the inner ring may have geometry configured to engage corresponding geometry of a hub.

In the illustrated embodiment shown in FIG. 1, the outer ring is a smooth outer ring configured to receive tread rubber. In alternative embodiments, the outer ring may have geometry configured to engage corresponding geometry of a strip of tread rubber.

Figure 2A:
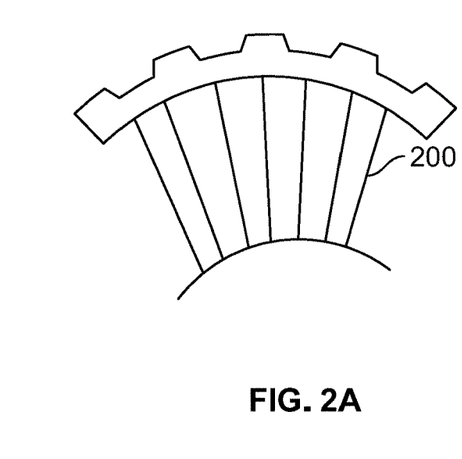
FIG. 2A is a schematic drawing illustrating a partial side view of one embodiment of a non-pneumatic tire with a plurality of spokes arranged in a radial orientation.
Figure 2B:
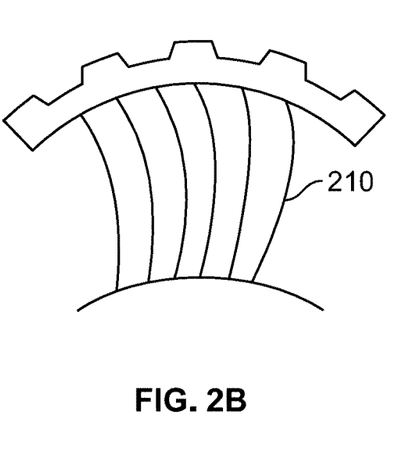
FIG. 2B is a schematic drawing illustrating a partial side view of another embodiment of a non-pneumatic tire with a plurality of spokes arranged in a radial web orientation.
Figure 2C:
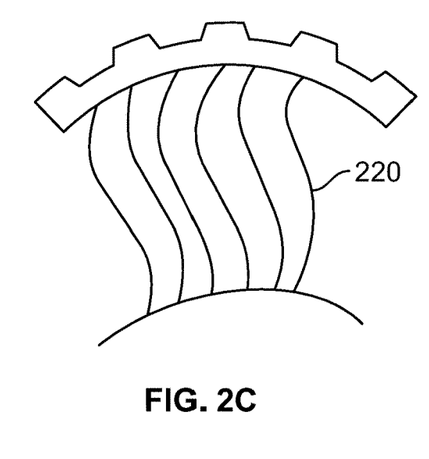
FIG. 2C is a schematic drawing illustrating a partial side view of yet another embodiment of a non-pneumatic tire with a plurality of spokes arranged in a radial web orientation.

In the illustrated embodiment, the plurality of spokes 40 are oriented in a generally radial direction. It should be understood that other spoke orientations or web structures may be employed. For example, FIG. 2A, FIG. 2B, FIG. 2C illustrate a plurality of spokes 200, 210, 220 arranged in various radial orientations. FIG. 2A illustrates a straight radial spoke orientation. FIG. 2B illustrates an arched radial spoke orientation. FIG. 2C illustrates a bent radial spoke orientation. In one embodiment, the spokes extend axially across the entire inner and outer rings. In another embodiment, the spokes extend axially across only a portion of the inner or outer rings.

In one embodiment, the plurality of spokes 40 are welded to the annular inner ring 20 and annular outer ring 30. In another embodiment, the plurality of spokes 40 are brazed to the annular inner ring 20 and annular outer ring 30. In yet another embodiment, the plurality of spokes can be cast into a metal wheel or otherwise bonded directly to the tread band. In still another embodiment, the plurality of spokes 40 are attached to the annular inner ring 20 and the annular outer ring 30 by overmolding an attachment piece to the end of each of the plurality of spokes 40. To overmold an attachment piece onto the spoke 40, an end of the spoke is placed in an injection mold and then plastic is injected around the spoke. As the plastic cools, it hardens and cools around the end of the spoke.

In another embodiment, the plurality of spokes 40 are attached to the annular inner ring 20 and the annular outer ring 30 by a combination of welding, brazing, solder, applying an adhesive, casting, and overmolding an attachment piece to the ends of the spokes 40.

Figure 2D:
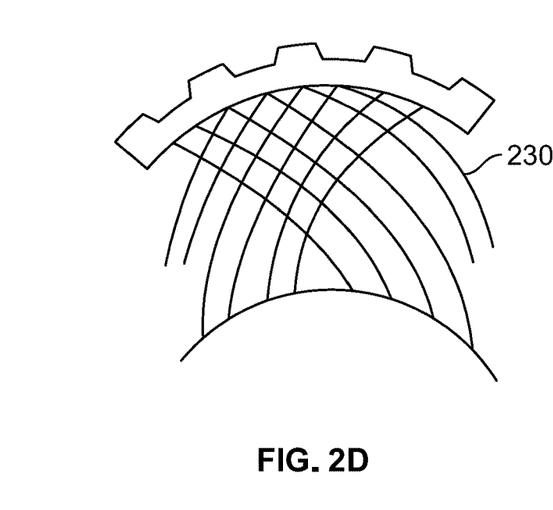
FIG. 2D is a schematic drawing illustrating a partial side view of still another embodiment of a non-pneumatic tire with a plurality of web elements arranged in an angled orientation.

In another embodiment, shown in FIG. 2D, an interconnected web 230 is illustrated. The interconnected web 230 can be a molded web that is attached to the inner and outer rings. In another embodiment, the interconnected web 230 is formed by a plurality of strips, with each strip extending across only a portion of the wheel. In such an embodiment, the plurality of strips may be spaced apart from each other, or may contact each other at one or more locations. Each individual strip connects to an inner or outer ring.

Figure 2E:
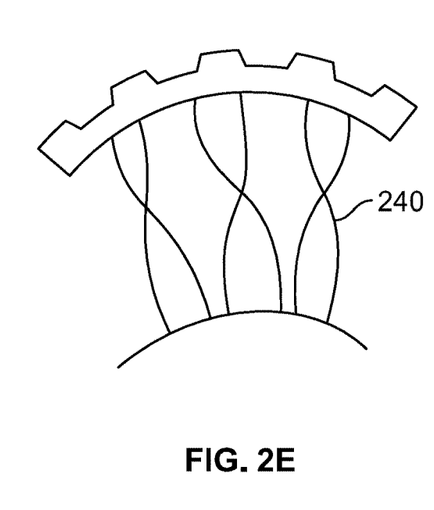
FIG. 2E is a schematic drawing illustrating a partial side view of yet another embodiment of a non-pneumatic tire with a plurality of joined web elements.
Figure 2F:
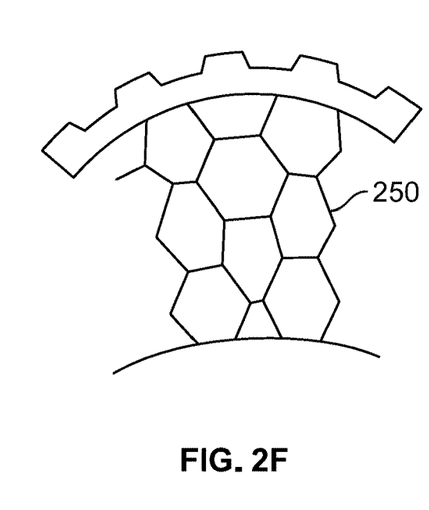
FIG. 2F is a schematic drawing illustrating a partial side view of still another embodiment of a non-pneumatic tire with a plurality of web elements arranged with a plurality of junctions.

FIG. 2E and FIG. 2F illustrate other examples of support structures 240, 250. In FIG. 2E, the support structure 240 can be molded structures that are attached to the inner and outer rings. In another embodiment, the support structure 240 is formed by a plurality of strips, with each strip extending across only a portion of the wheel. In such an embodiment, the plurality of strips may be spaced apart from each other, or may contact each other at one or more locations. Each individual strip connects to an inner or outer ring.

FIG. 2F illustrates a honeycomb geometry of an interconnected web structure. The interconnected web can have at least two radially adjacent layers of web elements that define a plurality of generally polygonal openings 250. In other embodiments (not shown), other web configurations may be employed. It should be understood that the geometries shown in FIGS. 1 and 2A-2F are merely exemplary and that any geometries may be employed. Similarly, other support structures may be employed instead of a webbing.

With continued reference to FIG. 2A through FIG. 2F the support structures can be metal elements formed through bending or through a press form process. In another embodiment, the metal elements can be formed through another forming process such as stamping or rolling.

In one embodiment, the spokes or web elements are formed by metal cords that are axially spaced along the inner and outer rings. In another embodiment, the spokes or web elements are formed by metal strips that are axially spaced along the inner and outer rings. In yet another embodiment, each spoke or web element is formed by a sheet of material. In such an embodiment, the process of bending the metal is performed on a discrete sheet of material. In an alternative embodiment, the process of bending the metal is performed on a material that is later cut into discrete sheets. In such an embodiment, the material may be provided as a roll of material.

Figure 3A:
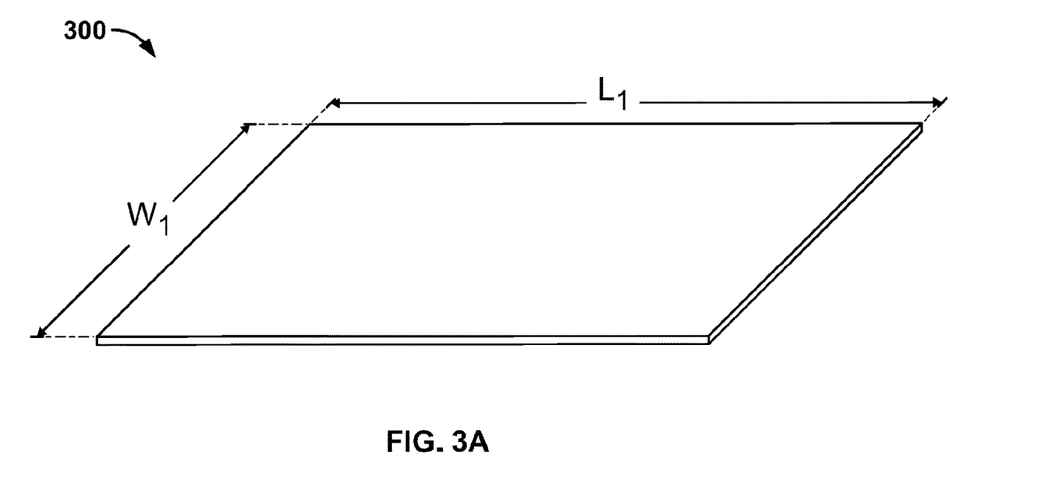
FIG. 3A is a schematic drawing illustrating a perspective view of one embodiment of a sheet of metal material.

FIG. 3A is a schematic drawing illustrating a perspective view of an exemplary sheet 300 of metal material that is used to form a spoke or a web element. The sheet 300 has a first length $L_1$ in a longitudinal direction, and a first width $W_1$ in a lateral direction, the first width $W_1$ being equal to the full width of the wheel. The first length $L_1$ is greater than the first width $W_1$. Thus, the sheet 300 may be referred to as an elongated sheet. In one embodiment, the sheet 300 is a spring steel strip. Spring steel specifically accommodates the need for the web elements to be very flexible without deformation. In an alternative embodiment, the metal is stainless steel. In another alternative embodiment, the metal may be another type of steel material.

Figure 3B:
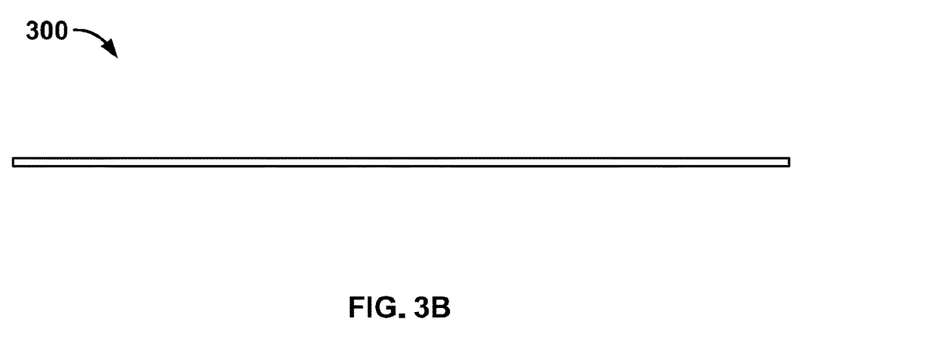
FIG. 3B is a schematic drawing illustrating a side view of the sheet of metal material.

FIG. 3B is a schematic drawing illustrating a side view of the sheet 300 of metal material. While the sheet 300 is depicted as a single, flat sheet, it may be provided in a roll of material that is cut to the desired size. The sheet 300 may be bent or curved to form a single spoke or web element. Alternatively, the sheet 300 may be cut into a plurality of sheets or strips to form multiple spokes or web elements.

Figure 4:
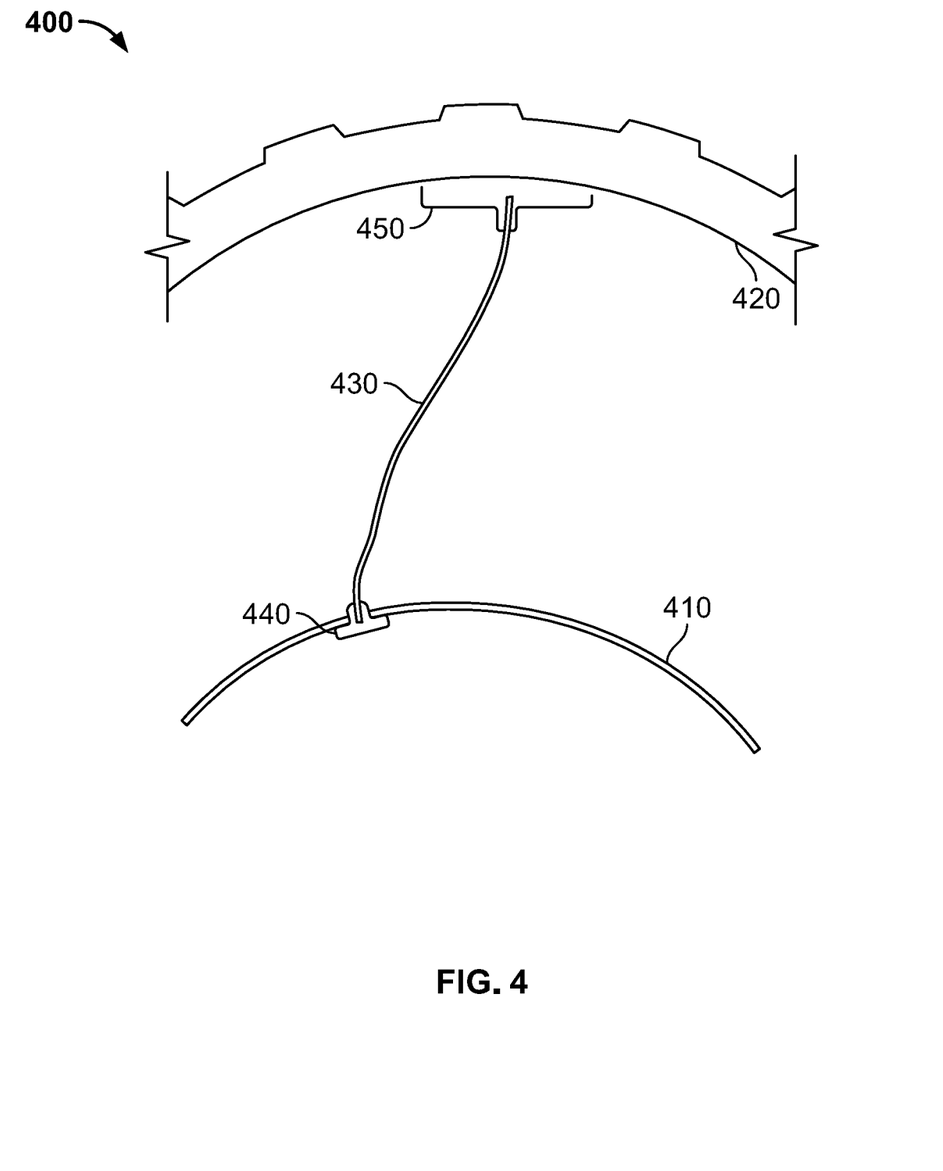
FIG. 4 is a schematic drawing illustrating a partial side view of one embodiment of a non-pneumatic tire with a first spoke in a ring.

FIG. 4 is a schematic drawing illustrating a partial side view of one embodiment of a non-pneumatic tire structure 400 having an inner ring 410 and an outer ring 420. For illustrative purposes, only a single spoke 430 is shown. A sheet of metal, such as the sheet 300, may be bent to form the spoke 430. It should be understood that the illustrated spoke is merely exemplary, and that the shape and angle of the bent portion of the spoke may vary. After the spoke 430 is formed, it is affixed to the inner annual ring 410 and outer annular ring 420.

In the illustrated embodiment, the ends of the spoke 430 are attached to the inner and outer rings 410, 420 by overmolding a first foot 440 onto a first end of the spoke 430 and overmolding a second foot 450 onto a second end of the spoke 430. The first foot 440 is attached to the inner ring 410 and the second foot 450 is attached to the outer ring 420.

In one embodiment, a metal foot is overmolded onto a metal web element and cast directly to a metal wheel or bonded directly to a tread band. In another embodiment, a polymeric foot is overmolded onto a metal web element and cast or bonded to a metal wheel or tread band. In yet another embodiment, a polymeric foot is overmolded onto a metal web element and bonded to a polymeric wheel or tread band.

After the spoke 430 is formed, the metal can be coated for protection. The coating provides environment protection, noise dampening, and improves the smoothness of the ride. In one embodiment, the metal may be coated in a painters dip.

In the illustrated embodiment, a plurality of spokes are formed and attached to the inner and outer rings in the manner described above. The number of spokes, web elements, or other support structure varies for the given type of non-pneumatic tire. The spokes can be angled to support torque transfer. In one embodiment, the plurality of spokes can be arranged in multiple planes to promote flexibility within the tire. In another embodiment, the plurality of spokes can have multiple angles. In another embodiment, the angles of the plurality of spokes support torque in both directions.

Figure 5A:
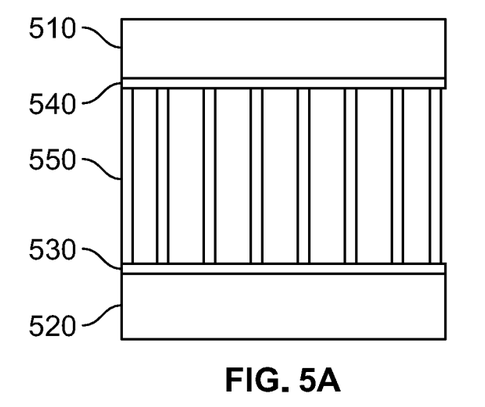
FIG. 5A is a schematic drawing illustrating a cross-section of one embodiment of a support structure in a non-pneumatic tire.
Figure 5B:
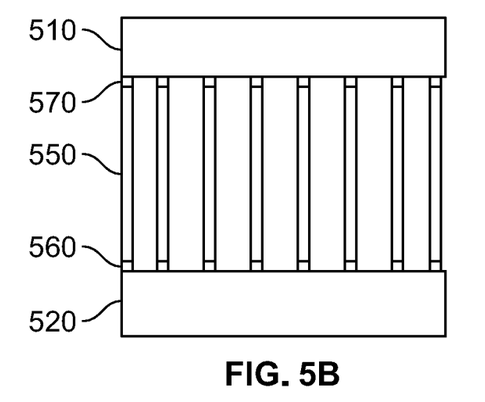
FIG. 5B is a schematic drawing illustrating a cross-section of another embodiment of a support structure in a non-pneumatic tire.
Figure 5C:
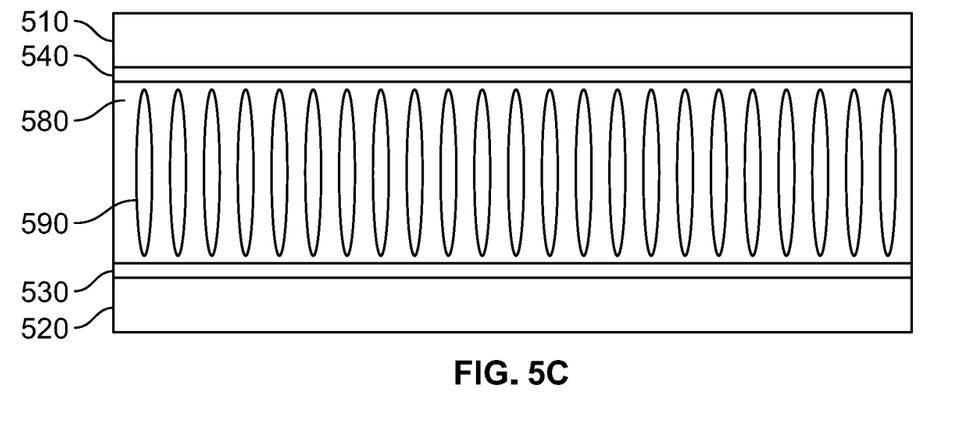
FIG. 5C is a schematic drawing illustrating a cross-section of yet another embodiment of a support structure in a non-pneumatic tire.

FIGS. 5A through 5C are schematic drawings illustrating cross-sections of non-pneumatic tires with various embodiments of a support structure. FIG. 5A illustrates a plurality of spokes 550 extending axially across a non-pneumatic tire between in outer ring 510 and an inner ring 520. A single, continuous first foot 530 is attached to a first end of each of the plurality of spokes 550. The single, continuous first foot 530 is also attached to the inner ring 520. Likewise, a single, continuous second foot 540 is attached to a second end of each of the plurality of spokes 550. The single, continuous second foot 540 is also attached to the outer ring 510.

FIG. 5B also illustrates a plurality of spokes 550 extending axially across a non-pneumatic tire between in outer ring 510 and an inner ring 520. A plurality of first feet 560 and a plurality of second feet 570 are also illustrated. One of the plurality of first feet 560 is attached to a first end of each of the plurality of spokes 550. Each of the plurality of first feet 560 is also attached to the inner ring 520. Likewise, one of the plurality of second feet 570 is attached to a second end of each of the plurality of spokes 550. Each of the plurality of second feet 570 is also attached to the outer ring 510.

FIG. 5C is a schematic drawing illustrating another embodiment of a cross-sectional view of the support structure. In the illustrated embodiment, a spoke 580 extends axially across the entire width of the non-pneumatic tire. The spoke 580 can be a single sheet of metal. The metal can have a plurality of cuts or slices 590 that do not extend the length of the metal. Such cuts or slices reduce the lateral stiffness of the material. While the cuts 590 are shown here as oval shaped, it should be understood that they may have any geometric shape.

In the illustrated embodiment, a single, continuous first foot 530 is attached to a first end of each of the spoke 580. The single, continuous first foot 530 is also attached to the inner ring 520. Likewise, a single, continuous second foot 540 is attached to a second end of each of the spoke 580. The single, continuous second foot 540 is also attached to the outer ring 510. In an alternative embodiment (not shown), a single spoke may extend across the width of the non-pneumatic tire, and be attached to the inner ring by a plurality first feet and attached to the outer ring by a plurality of second feet.

Figure 6A:
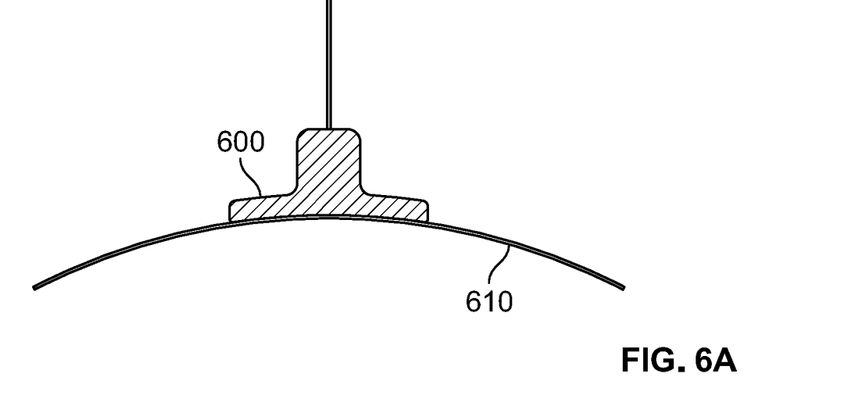
FIG. 6A is a schematic drawing illustrating a partial side view of a non-pneumatic tire with a metal foot overmolded onto a web element.
Figure 6B:
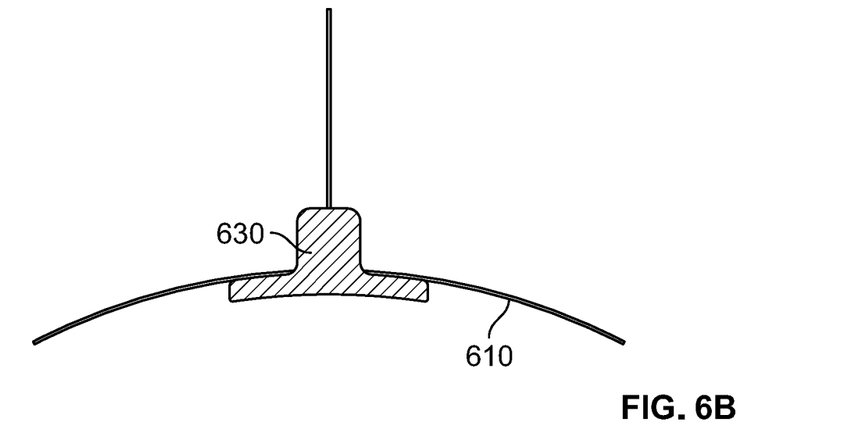
FIG. 6B is a schematic drawing illustrating a partial side view of another embodiment of a non-pneumatic tire with a metal foot overmolded onto a web element.
Figure 6C:
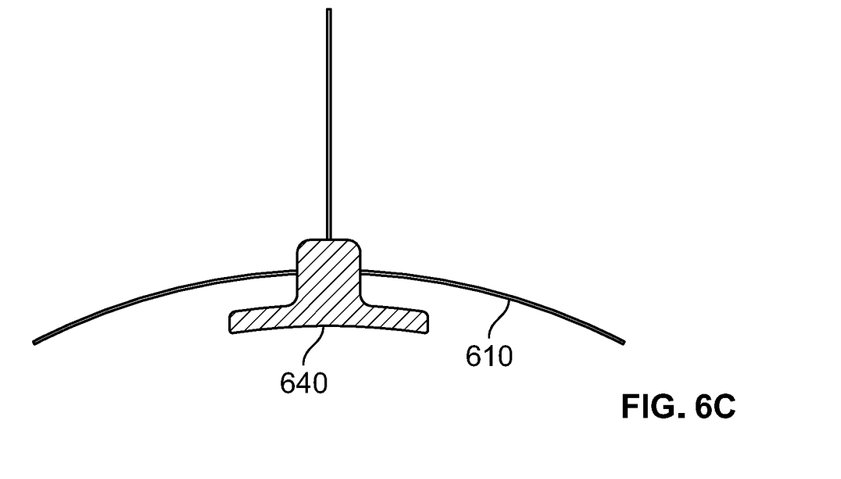
FIG. 6C is a schematic drawing illustrating a partial side view of yet another embodiment of a non-pneumatic tire with a metal foot overmolded onto a web element.

FIGS. 6A-C are schematic drawings of various embodiments of attaching a foot to an inner ring of a tire. It should be understood that similar methods may be employed to attach a foot to the outer ring of a tire.

FIG. 6A illustrates a foot 600 overmolded onto a support structure. The support structure may be bent at the end before the foot 600 is overmolded onto it. In this embodiment, the foot 600 is attached to an outer surface of the inner ring 610. In one such embodiment, the foot 600 and the inner ring 610 are both constructed of the same material. For example, both the foot 600 and the inner ring 610 may be constructed of metal. In such an embodiment, the foot 600 may be welded or brazed to the inner ring 610. Alternatively, the foot 600 may be affixed to the inner ring 610 with an adhesive. As another alternative embodiment, the foot 600 may be affixed to the inner ring 610 with rivets, staples, bolts, or other mechanical fasteners.

As another example, both the foot 600 and the inner ring 610 may be constructed of a polymeric material. In such an embodiment, the foot 600 may be welded or brazed to the inner ring 610. Alternatively, the foot 600 may be affixed to the inner ring 610 with an adhesive. As another alternative embodiment, the foot 600 may be affixed to the inner ring 610 with mechanical fasteners.

FIG. 6B illustrates a foot 630 overmolded onto a support structure. The support structure may be bent at the end before the foot 630 is overmolded onto it. In this embodiment, the foot 630 is attached to an inner surface of the inner ring 610. In one such embodiment, the foot 630 and the inner ring 610 are both constructed of the same material. For example, both the foot 630 and the inner ring 610 may be constructed of metal. In such an embodiment, the metal annular inner ring 610 is cast around the metal foot 630.

FIG. 6C illustrates a foot 640 overmolded onto a support structure. The support structure may be bent at the end before the foot 640 is overmolded onto it. In this embodiment, a channel is formed in the inner annular ring 610 and the foot 640 is slid into the channel The foot 640 may be secured in the channel by welding, brazing, adhesive, or with mechanical fasteners. Alternatively, the foot may not be secured within the channel. In one embodiment, the inner annular ring 610 and the foot 640 are both constructed of the same material. In another embodiment, the inner annular ring 610 and the foot 640 are constructed of different materials.

All of the above described attachment methods in FIGS. 6A through FIG. 6C are combinable and a combination of attachment methods can be utilized in the same tire. For example, in one embodiment, one end of the overmolded foot can be attached to the inner or outer ring using a welding and the opposite end of the overmolded foot can be attached to the inner or outer ring by being slid into a channel. The overmolded foot can be attached using a welding or brazing process. In another embodiment, the foot can be attached using a friction weld. In another embodiment the foot can be attached using an adhesive. In yet another embodiment, the foot can be attached using solder.

Figure 7A:
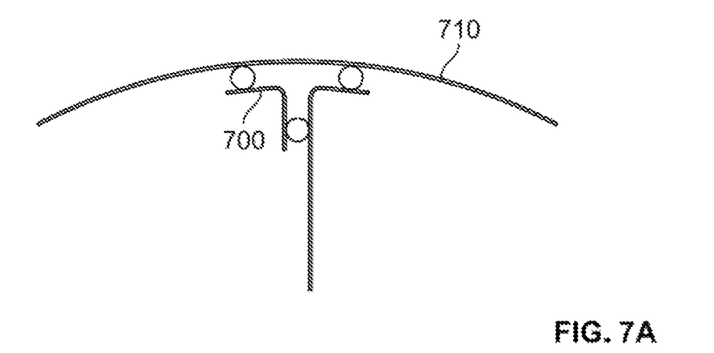
FIG. 7A is a schematic drawing illustrating a partial side view of a metal foot welded to a metal wheel.
Figure 7B:
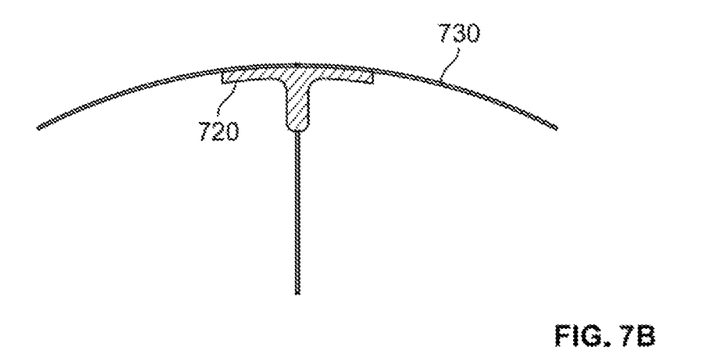
FIG. 7B is a schematic drawing illustrating a partial side view of a metal foot attached to a metal wheel using a brazing method.
Figure 7C:
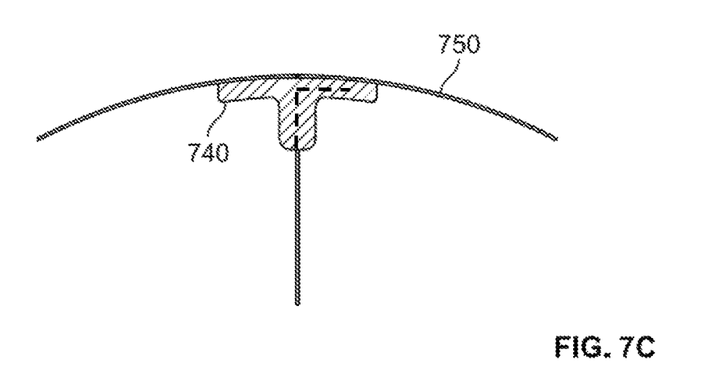
FIG. 7C is a schematic drawing illustrating a partial side view of a polymeric foot attached to a polymeric wheel.

FIGS. 7A-C are schematic drawings illustrating additional ways to attach a support structure to a tire. In these illustrations, the support structures are being attached to an outer ring of a tire. It should be understood that similar methods may be employed to attach a support structure to the inner ring of the tire.

FIG. 7A illustrates a support structure having a bent end. A bracket 700 is welded to the support structure. The bracket 700 and the bent end of the support structure are likewise welded to on outer ring 710. The welding beads are exaggerated in this figure for illustrative purposes. In this embodiment, the support structure, the bracket 700, and the outer ring 710 are all constructed of the same material. For example, the support structure, the bracket 700, and the outer ring 710 may be constructed of metal, such as spring steel, or of a polymeric material.

FIG. 7B illustrates a support structure attached to an outer ring 730 by brazing the end of the support structure 720. The solder flow of brazing creates a large contact area, which is exaggerated in this figure for illustrative purposes. In this embodiment, the end of the support structure 720 and the outer ring 730 are constructed of the same material. For example, the end of the support structure 720 and the outer ring 730 may be constructed of metal, such as spring steel, or of a polymeric material.

FIG. 7C illustrates a polymer foot 740 attached to a polymer wheel 750. The metal spoke is formed with a hook on the end that hooks to the polymer foot. The polymer foot is attached using an adhesive. In another embodiment, the foot is attached using a heat process. In another embodiment, the foot is attached using an overmold process.

After the desired number of spokes are formed, they are connected to the inner and outer rings. In one embodiment, the inner ring and the outer ring are constructed of the same material as the plurality of spokes. In an alternative embodiment, at least one of the inner ring and the outer ring is constructed of a different material from the plurality of spokes.

In another alternative embodiment, the overmolded foot may be directly attached to a strip of tread rubber.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of making a non-pneumatic tire, the method comprising:
    providing a plurality of elongated sheets of metal material;
    bending the plurality of elongated sheets of metal material to form a plurality of metal spokes;
    bending a first end of each of the plurality of metal spokes to form a hook;
    overmolding a first polymeric foot onto the hook of the first end of each of the plurality of metal spokes;
    providing an inner ring of metal material;
    affixing the inner ring of metal material to the first polymeric foot;
    providing an outer ring of metal material;
    affixing the outer ring of metal material to a second end of each of the plurality of metal spokes;
    providing tread rubber; and
    affixing the tread rubber to the outer ring of metal material.

2. The method of claim 1, further comprising dip coating the plurality of metal spokes.

3. The method of claim 1, wherein the plurality of metal spokes are bent in differing directions to form a crisscross pattern.

4. The method of claim 1, wherein the affixing of the inner ring of metal material to the first polymeric foot includes one of welding, brazing, using an adhesive, or soldering the first polymeric foot to the inner ring of metal material.

5. The method of claim 1, wherein the affixing of the inner ring of metal material to the first polymeric foot includes casting the inner ring of metal material around the first polymeric foot.

6. The method of claim 1 further comprising overmolding a second polymeric foot onto the second end of each of the plurality of spokes,
    wherein the affixing of the outer ring of metal material to the second end of each of the plurality of spokes includes affixing the outer ring of metal material to the second polymeric foot.

7. The method of claim 6, wherein the affixing of the outer ring of metal material to the second polymeric foot includes one of welding, brazing, using an adhesive or soldering the second polymeric foot to the outer ring of metal material.

8. The method of claim 6, wherein the affixing of the second polymeric foot to the outer ring of metal material includes casting the outer ring of metal material around the second polymeric foot.

9. The method of claim 6, wherein the affixing of the inner ring of metal material to the first polymeric foot includes sliding the first polymeric foot into a channel formed in the inner ring of metal material, and wherein the affixing of the outer ring of metal material to the second polymeric foot includes sliding the second polymeric foot into a channel formed in the outer ring of metal material.

10. The method of claim 1, wherein the bending of the plurality of the elongated sheets of metal material to form the plurality of metal spokes includes placing the plurality of spokes in an axially spaced formation across a width of the non-pneumatic tire.

11. The method of claim 1, further comprising cutting slices in the elongated sheets of metal material.

12. The method of claim 1, further comprising cutting openings in the plurality of elongated sheets of metal material.

13. A non-pneumatic tire comprising:
an inner ring of metal material;
an outer ring of metal material;
a plurality of bent metal spokes, wherein each bent metal spoke has a hook formed at a first end;
a first overmolded polymeric foot formed over the hook of the first end of each bent metal spoke, each first overmolded polymeric foot being attached to the inner ring by one of brazing, welding, casting, or adhering with an adhesive; and
a second overmolded polymeric foot at a second end of each bent metal spoke, each second overmolded polymeric foot being attached to the outer ring by one of brazing, welding, casting, or adhering with an adhesive.

14. A method of making a non-pneumatic tire, the method comprising:
providing a plurality of metal support structures, wherein each of the plurality of metal support structures has a hook formed at a first end;
overmolding a first polymeric foot onto the hook of the first end of each of the plurality of metal support structures;
overmolding a second polymeric foot onto a second end of each of the plurality of metal support structures;
providing an inner ring of metal material;
affixing the inner ring of metal material to the first polymeric foot;
providing an outer ring of metal material;
affixing the outer ring of metal material to the second polymeric foot;
providing tread rubber; and
affixing the tread rubber to the outer ring.

15. The method of claim 14, wherein the plurality of metal support structures are bent in differing directions and joined to form a crisscross pattern.

16. The method of claim 14, wherein the affixing of the inner ring to the first polymeric foot includes one of welding the inner ring to the first polymeric foot, brazing the inner ring to the first polymeric foot, casting the inner ring around the first polymeric foot, adhering the inner ring to the first polymeric foot with an adhesive, or sliding the first polymeric foot into a channel formed in the inner ring.

17. The method of claim 14, wherein the affixing of the outer ring to the second polymeric foot includes one of welding the outer ring to the second polymeric foot, brazing the outer ring to the second polymeric foot, casting the outer ring around the second polymeric foot, adhering the outer ring to the second polymeric foot with an adhesive, or sliding the second polymeric foot into a channel formed in the outer ring.

18. The method of claim 14, further comprising dip coating the plurality of metal support structures.

* * * * *